US008032834B2

(12) United States Patent
Burton et al.

(10) Patent No.: US 8,032,834 B2
(45) Date of Patent: Oct. 4, 2011

(54) CONTEXT-BASED USER ASSISTANCE

(75) Inventors: Mary Catherine Burton, Springfield, IL (US); Fonda J. Daniels, Cary, NC (US); Sandra K. Johnson, Austin, TX (US); Ruthie D. Lyle, Durham, NC (US); Kelly Malone, Poughkeepsie, NY (US); LaTondra Alyce Murray, Durham, NC (US); Demethria Johnson Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/557,444

(22) Filed: Nov. 7, 2006

(65) Prior Publication Data

US 2008/0109723 A1    May 8, 2008

(51) Int. Cl.
*G06F 15/177* (2006.01)
*G06F 3/048* (2006.01)
(52) U.S. Cl. .................... 715/735; 715/780; 715/817
(58) Field of Classification Search .................. 715/708, 715/735, 780, 817
See application file for complete search history.

(56) References Cited

U.S. PATENT DOCUMENTS

| 5,832,452 | A * | 11/1998 | Schneider et al. ............... 705/5 |
| 6,134,019 | A * | 10/2000 | Wantuck et al. ............. 358/1.15 |
| 6,262,730 | B1 | 7/2001 | Horvitz et al. |
| 6,467,081 | B2 | 10/2002 | Vaidyanathan et al. |
| 6,640,145 | B2 | 10/2003 | Hoffberg et al. |
| 6,694,314 | B1 * | 2/2004 | Sullivan et al. ........................ 1/1 |
| 6,782,383 | B2 * | 8/2004 | Subramaniam et al. ....... 707/706 |
| 7,043,700 | B1 * | 5/2006 | Bertram et al. ............... 715/811 |
| 7,190,351 | B1 * | 3/2007 | Goren ........................... 345/173 |
| 7,224,989 | B2 * | 5/2007 | Kraft ............................. 455/466 |
| 7,251,609 | B1 * | 7/2007 | McAlindon et al. .............. 705/3 |
| 2003/0048304 | A1 | 3/2003 | Lontka et al. |
| 2003/0084335 | A1 | 5/2003 | Moran et al. |
| 2003/0122859 | A1 | 7/2003 | Aggarwal et al. |
| 2003/0169293 | A1 * | 9/2003 | Savage .......................... 345/762 |
| 2004/0036715 | A1 * | 2/2004 | Warren ......................... 345/713 |
| 2004/0243586 | A1 * | 12/2004 | Byers ............................. 707/100 |
| 2004/0268267 | A1 | 12/2004 | Moravcsik |
| 2006/0100998 | A1 * | 5/2006 | Edwards et al. .................. 707/3 |
| 2006/0123354 | A1 * | 6/2006 | Volovitz ........................ 715/780 |
| 2007/0192168 | A1 * | 8/2007 | Van Luchene .................. 705/10 |
| 2007/0250492 | A1 * | 10/2007 | Angel et al. ...................... 707/4 |

OTHER PUBLICATIONS

"Darwin Information Typing Architecture (DITA XML)", Cover Pages, Technology Reports, Mar. 22, 2006, [online] [retrieved Jun. 14, 2006] http://xml.coverpages.org/dita.html.

"Welcome to the IBM TotalStorage DS6000 Information Center", IBM Corporation, Jun. 12, 2006, [online] [retrieved Jun. 14, 2006] http://publib.boulder.ibm.com/infocenter/dsichelp/ds6000ic/topic/com.ibm.storage.smric.help.doc/...

(Continued)

*Primary Examiner* — Weilun Lo
*Assistant Examiner* — Shashi Becker
(74) *Attorney, Agent, or Firm* — Janaki K. Davda; Konrad Raynes and Victor LLP

(57) ABSTRACT

Provided are techniques for providing context-based user assistance. A request from a user for user assistance content for a first configurable element is received. One or more rules are retrieved for the first configurable element, wherein at least one of the rules describes a second configurable element that is related to the first configurable element. The one or more rules are used to identify context-based user assistance content for configuring at least one of the first configurable element and the second configurable element. The user assistance content is provided to the user.

12 Claims, 4 Drawing Sheets

OTHER PUBLICATIONS

"Welcome to the IBM TotalStorage DS8000 Information Center", IBM Corporation, Jun. 12, 2006, [online] [retrieved Aug. 2, 2006] http://publib.boulder.ibm.com/infocenter/dsichelp/ds8000ic/topic/com.ibm.storage.ssic.help.doc/f2c...

"iSeries Information Center overview and what's new Version 5 Release 3 (V5R3)", IBM Corporation, [online] [retrieved Aug. 2, 2006] http://publib.boulder.ibm.com/infocenter/iseriesp/v5r3/topic/rzahg/rzahgicoverview.htm.

* cited by examiner

CONTEXT-BASED USER ASSISTANCE

BACKGROUND

1. Field

Embodiments of the invention relate to context-based user assistance.

2. Description of the Related Art

Existing user assistance technologies are elementary in their delivery of user assistance. User Assistance (e.g., in the form of online help) is traditionally presented in a static format. For example, HyperText Markup Language (HTML) files are typically used to present user assistance content within web browsers or customized tools.

In addition, recent technologies, such as the Darwin Information Typing Architecture (DITA), an XML-based technology, have been used to provide more structure and substance to delivery of user assistance content. However, there are limitations to these technologies due to the lack of information about the context in which the user assistance is provided.

For example, products that require a user to enter data into configurable elements (e.g., parameters) may provide basic information about required inputs to the configurable elements, but these products may not provide much guidance about how configurable elements interact. For example, if a user inquires about a specific configurable element in a system, the assistance may define the configurable element, how the configurable element is used, and give recommended values for the configurable element, without providing content on how that configurable element interacts with other configurable elements.

There are some existing user assistance technologies that provide some level of sophistication in their delivery of user assistance content. For example, the IBM eServer iSeries Information Center, available from International Business Machines Corporation, leads the user through a questionnaire and produces a custom checklist for the user. As another example, an offline configurator limits future configuration choices for the user based upon existing choices for compatibility. As an example, the IBM TotalStorage DS6000 Information Center and the IBM TotalStorage DS8000 Information Center, available from International Business Machines Corporation, have information on how to use offline configurators that may be accessed via the Information Centers.

Existing user assistance technologies, however, do not exhibit the kind of intelligence that provides guidance to the user regarding the context in which the configurable element is used, which would provide valuable information to the user regarding the operation or tuning of the system. Users are often required to use a trial-and-error approach to determine how overall product tuning and performance is impacted by configuration changes. Thus, there is a need for online help to provide users with more detailed information about the interaction of configurable elements before the changes are deployed in a live system.

SUMMARY OF EMBODIMENTS OF THE INVENTION

Provided are a method, computer program product, and system for providing context-based user assistance. A request from a user for user assistance content for a first configurable element is received. One or more rules are retrieved for the first configurable element, wherein at least one of the rules describes a second configurable element that is related to the first configurable element. The one or more rules are used to identify context-based user assistance content for configuring at least one of the first configurable element and the second configurable element. The user assistance content is provided to the user.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
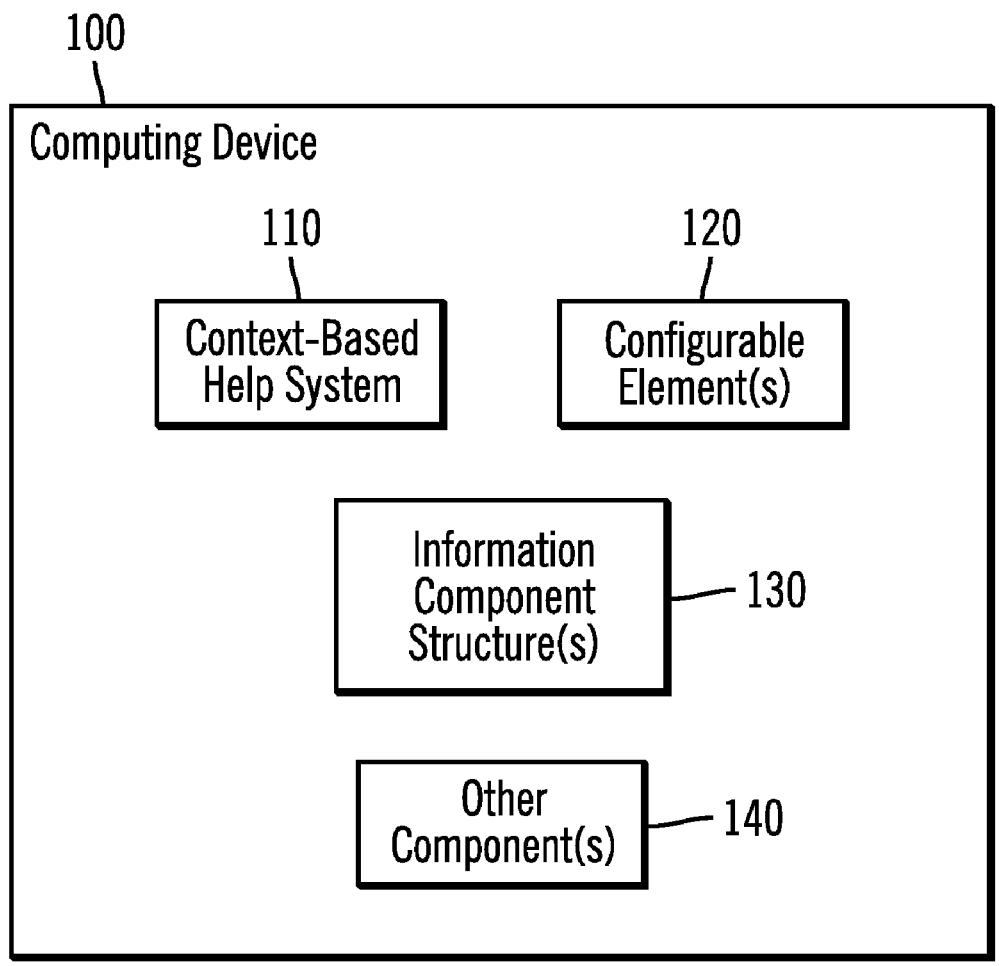
FIG. 1 illustrates details of a computing device in accordance with certain embodiments.

FIG. 1 illustrates details of a computing device in accordance with certain embodiments. A computing device 100 includes a context-based help system 110, one or more configurable elements 120, one or more information component structures 130, and may include one or more other components 140 (e.g., application programs, drivers, etc.). In certain embodiments, each configurable element 120 is associated with an information component, and information about the context of the configurable element is stored in the information component structure 130 for the associated information component. The information components may be, for example, products (e.g., software applications), components of products (e.g., software components), solutions, solution building blocks, or other similar information components that work together to compose a solution to a problem. For example, an information component may be a software application, and examples of configurable elements for such an information component are tuning parameters that enable a particular function within an application. Other examples of configurable elements include initialization parameters and convergence parameters. Embodiments of the invention are also applicable to a suite of applications, in which case, altering the configuration of one application in the suite requires the configuration of one or more other applications in the suite to be modified.

Embodiments provide a technique for associating context-based information about other relevant configurable elements with a specific configurable element (e.g., by associating the information with a specific configurable element value or other relevant information) and a process for utilizing this associated configurable element information in the delivery of intelligent context-based user assistance.

Figure 2:
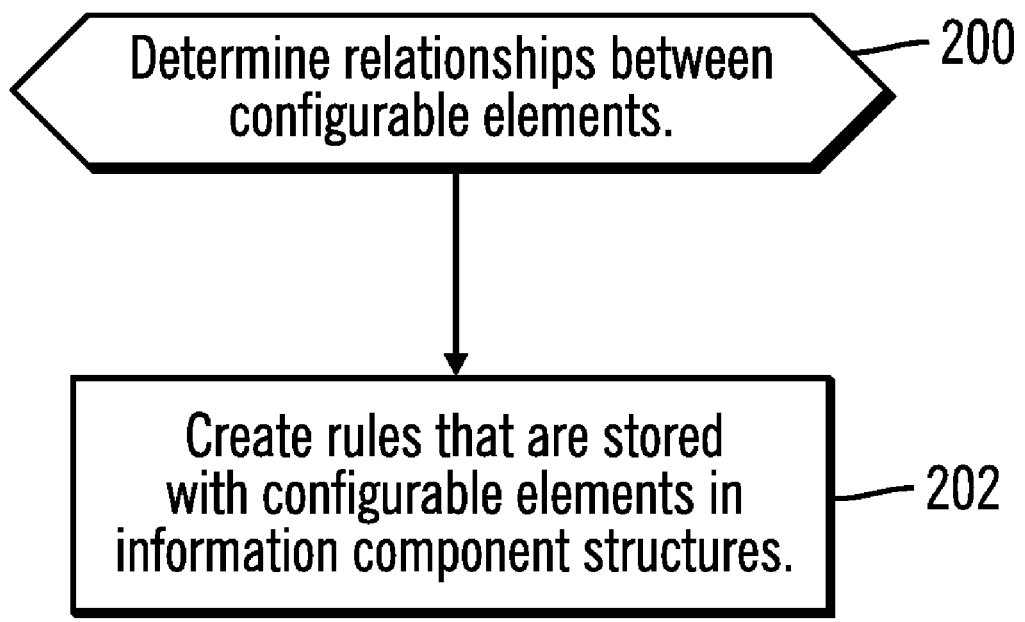
FIG. 2 illustrates logic for creating one or more rules in accordance with certain embodiments.

FIG. 2 illustrates logic for creating one or more rules in accordance with certain embodiments. A user, such as a system administrator, determines relationships between configurable elements (block 200). Based on the relationships, the user creates one or more rules that are stored with the configurable elements in information component structures 130 (block 202).

In certain embodiments, the rules are pre-loaded into the information component structures 130. In certain embodiments, the rules may be dynamically modified (e.g., when an information component is modified).

That is, the context-based help system 100 uses the information component structures 130 to store information describing a configurable element (e.g., DITA may be used for this purpose) as well as context-based information associated with a configurable element. For example, consider a configurable element CP1 in information component A. In this example, if configurable element CP1 in information component A is set to X, then another configurable element, CP2, in information component B should be set to Z in order for a system to achieve optimal performance. Therefore, the information component structure 130 used to store configurable element CP1 in information component A includes a rule such as the following Rule (1):

if CP1 in element A is set to [D . . . F] then set CP2 in element B to [X . . . Y], where [D . . . F] and [X . . . Y] are ranges of values <1-10>

Figure 3:
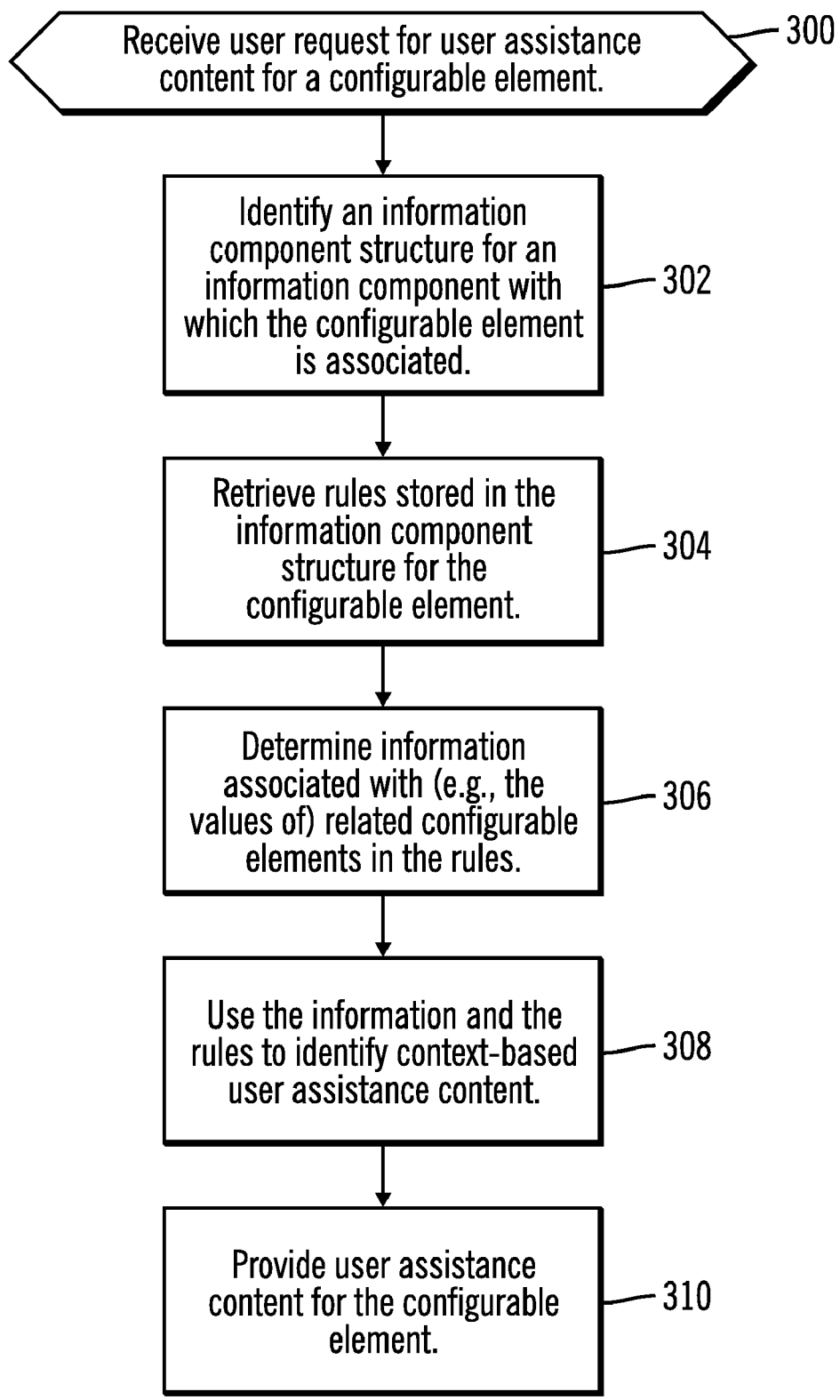
FIG. 3 illustrates logic for providing intelligent context-based user assistance in accordance with certain embodiments.

FIG. 3 illustrates logic for providing intelligent context-based user assistance in accordance with certain embodiments. Control begins in block 300 with the context-based help system 110 receiving a user request for help for a configurable element. Then, the context-based help system 110 determines the relationship of that configurable element with one or more other user configurable elements using the rules stored in the information component structures 130. In particular, in block 302, the context-based help system 110 identifies an information component structure 130 for an information component with which the configurable element is associated. In block 304, the context-based help system 110 retrieves rules stored in the information component structure 130 for the configurable element. In block 306, the context-based help system 110 determines the information associated with (e.g., values of) related configurable elements in the rules. In block 308, the context-based help system 110 uses the information (e.g., values) and the rules to identify context-based user assistance content.

In block 310, the context-based help system 110 provides user assistance content for the configurable element. The user assistance content may include, for example, one or more of text, a selection list (e.g., a drop-down list), diagrams, audio or other format assistance.

With reference to Rule (1), when an inquiry is made regarding configurable element CP1 in information component A (e.g., "how do I change the value of CP1?"), then the context-based help system 110 informs the user that if CP1 is set in the [D . . . F] range, then related configurable element CP2 should be set to [X . . . Y] for optimal performance. As another example, for a different rule, when an inquiry is made regarding configurable element CP1 in information component A (e.g., "how do I change the value of CP1?"), then the context-based help system 110 may inform the user that CP1 should be set in the [D . . . F] range because related configurable element CP2 is set in the [X . . . Y] range. Although the examples herein may have used ranges in the rules, one skilled in the art would recognize that specific values may be used instead of ranges and several associations may be included for a specific information component.

With embodiments, any extensions, enhancements, or any other changes to an information component are used by the context-based help system 110 to provide user assistance content. For example, if information component A in the above example is changed, this may cause a corresponding change in the configurable element CP1 and CP2 association, a new association between different configurable elements for elements A and B, a new dependency between element A and some other element, or some other relevant change. In certain embodiments, such changes are captured with existing rules in the information component structures. In certain alternative embodiments, these changes may be captured by changing the rules.

With embodiments, users benefit from the presentation of online help that not only provides content to describe configurable elements, but additionally provides specific intelligent assistance based on the context of these configurable elements within a product or solution. Embodiments provide users with insight about complex system configuration issues when information associated with (e.g., the values of) configurable elements have relationships with other configurable elements or directly impact system operation or performance. If specific configurations produce product or solution scenarios that yield inefficient or degraded system performance, or even ineffective system operation, embodiments provide users with relevant information before deployment of the configurable elements into production environments. Embodiments additionally facilitate the troubleshooting process when users attempt to diagnose system problems or correct configuration errors. Embodiments are applicable to assisting a user with configuration of parameters for a suite of tools, whether the suite of tools is distributed or not distributed.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2 and 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2 and 3 may be implemented in software, hardware, programmable and non-programmable gate array logic or in some combination of hardware, software, or gate array logic.

Figure 4:
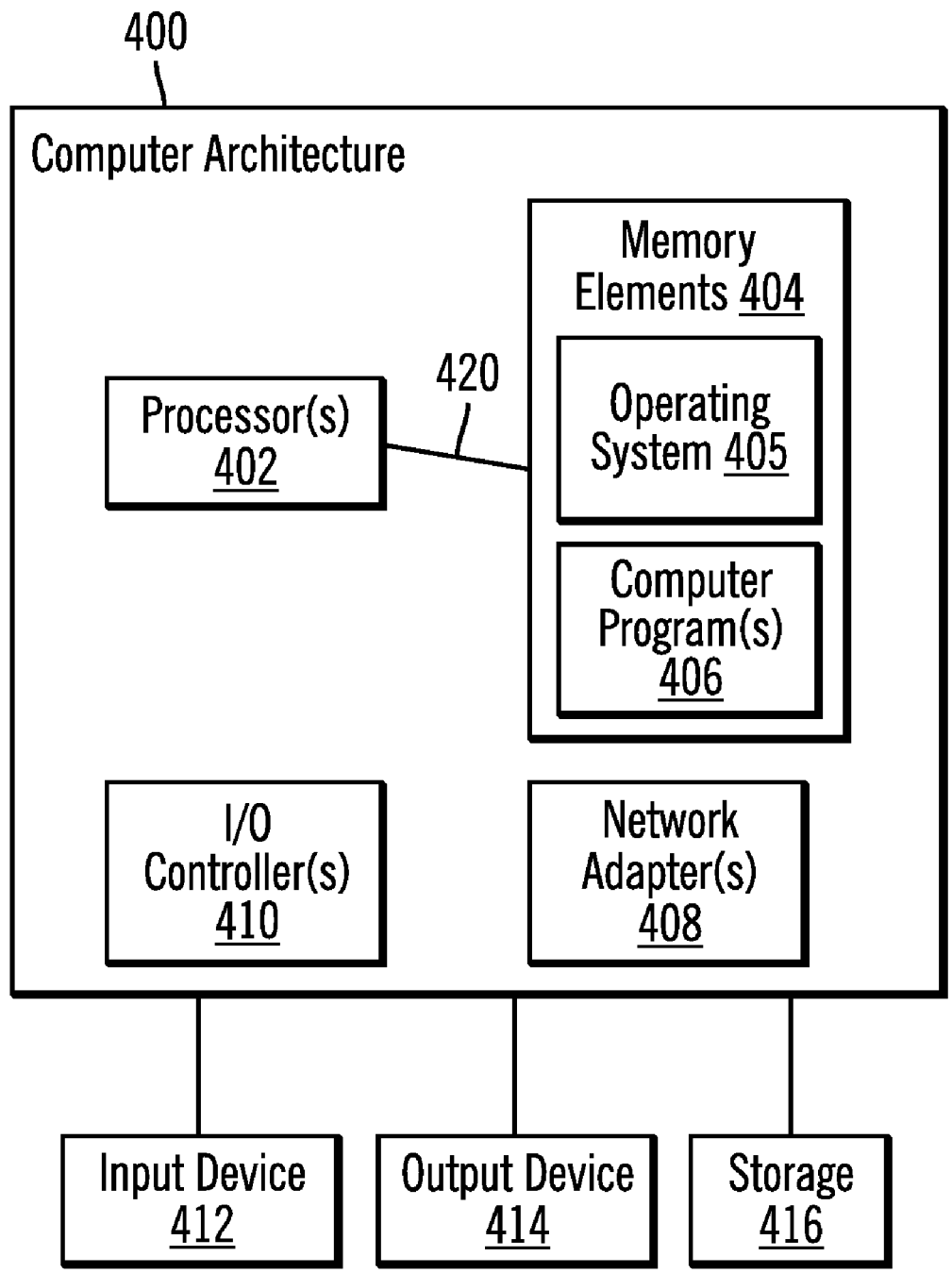
FIG. 4 a system architecture that may be used in accordance with certain embodiments.

FIG. 4 illustrates a system architecture 400 that may be used in accordance with certain embodiments. Computing device 100 may implement system architecture 400, and the context-based help system 100 may be implemented in software, hardware, programmable and non-programmable gate array logic or in some combination of hardware, software, or gate array logic in system architecture 400.

The system architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The system architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The system architecture 400 may include fewer components than illustrated, additional components not illustrated herein, or some combination of the components illustrated and additional components. The system architecture 400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A non-transitory computer program product comprising a computer-readable medium storing a computer readable program, wherein the computer readable program when executed by a processor on a computer causes the computer to:

for each of multiple configurable elements, store information describing a configurable element comprising a parameter and context-based rules associated with the configurable element in an information component structure;

receive a request from a user in a form of a question asking how to change a value of a first configurable element comprising a first parameter that is associated with a first software application and that enables a function in the first software application;

identify an information component structure for the first software application with which the first configurable element is associated;

determine a dependency relationship of the first configurable element with a second configurable element using the stored rules for the first configurable element, wherein at least two of the rules describe the dependency relationship between the first configurable element and the second configurable element, wherein the second configurable element comprises a second parameter that is associated with a second software application and that enables a function in the second software application;

based on a first rule, provide context-based user assistance content to the user in text form of a first dependency relationship by indicating that, in response to the value of the first configurable element being set to a first value, a value of the second configurable element should be set by the user to a second value to tune the second software application; and based on a second rule, provide the context-based user assistance content to the user in the text form of a second dependency relationship by indicating that the value for the first configurable element should be set by the user to a third value in response to the value of the second configurable element being set to a fourth value to tune the first software application.

2. The computer program product of claim 1, wherein the computer readable program when executed on a computer causes the computer to:

determine information associated with the second configurable element, wherein the stored rules and the information are used to identify the context-based user assistance content.

3. The computer program product of claim 1, wherein the stored rules are dynamically modified when the information component is modified.

4. A computer-implemented method for providing context-based user assistance, comprising:

for each of multiple configurable elements, storing information describing a configurable element comprising a parameter and context-based rules associated with the configurable element in an information component structure;

receiving a request from a user in a form of a question asking how to change a value of a first configurable element comprising a first parameter that is associated with a first software application and that enables a function in the first software application;

identifying an information component structure for the first software application with which the first configurable element is associated;

determining a dependency relationship of the first configurable element with a second configurable element using the stored rules for the first configurable element, wherein at least two of the rules describe the dependency relationship between the first configurable element and the second configurable element, wherein the second configurable element comprises a second parameter that is associated with a second software application and that enables a function in the second software application;

based on a first rule, providing context-based user assistance content to the user in text form of a first dependency relationship by indicating that, in response to the value of the first configurable element being set to a first value, a value of the second configurable element should be set by the user to a second value to tune the second software application; and based on a second rule, providing the context-based user assistance content to the user in the text form of a second dependency relationship by indicating that the value for the first configurable element should be set by the user to a third value in response to the value of the second configurable element being set to a fourth value to tune the first software application.

5. The computer-implemented method of claim 4, further comprising:

determine information associated with the second configurable element, wherein the stored rules and the information are used to identify the context-based user assistance content.

6. The computer-implemented method of claim 4, wherein the stored rules are dynamically modified when the information component is modified.

7. A system for providing context-based user assistance, comprising:

a processor; and hardware logic performing operations, the operations comprising:

for each of multiple configurable elements, storing information describing a configurable element comprising a parameter and context-based rules associated with the configurable element in an information component structure;

receiving a request from a user in a form of a question asking how to change a value of a first configurable element comprising a first parameter that is associated with a first software application and that enables a function in the first software application;

identifying an information component structure for the first software application with which the first configurable element is associated;

determining a dependency relationship of the first configurable element with a second configurable element using the stored rules for the first configurable element, wherein at least two of the rules describe the dependency relationship between the first configurable element and the second configurable element, wherein the second configurable element comprises a second parameter that is associated with a second software application and that enables a function in the second software application;

based on a first rule, provide context-based user assistance content to the user in text form of a first dependency relationship by indicating that, in response to the value of the first configurable element being set to a first value, a value of the second configurable element should be set by the user to a second value to tune the second software application; and based on a second rule, providing the context-based user assistance content to the in the text form of a second dependency relationship user by indicating that the value for the first configurable element should be set by the user to a third value in response to the value of the second configurable element being set to a fourth value to tune the first software application.

8. The system of claim 7, further comprising:

determining information associated with the second configurable element, wherein the stored rules and the information are used to identify the context-based user assistance content.

9. The system of claim 7, wherein the stored rules are dynamically modified when the information component is modified.

10. A method for providing a service, the service comprising:

for each of multiple configurable elements, storing information describing a configurable element comprising a parameter and context-based rules associated with the configurable element in an information component structure;

receiving a request from a user in a form of a question asking how to change a value of a first configurable element comprising a first parameter that is associated with a first software application and that enables a function in the first software application;

identifying an information component structure for the first software application with which the first configurable element is associated;

determining a dependency relationship of the first configurable element with a second configurable element using the stored rules for the first configurable element, wherein at least two of the rules describe the dependency relationship between the first configurable element and the second configurable element, wherein the second configurable element comprises a second parameter that is associated with a second software application and that enables a function in the second software application;

based on a first rule, provide context-based user assistance content to the user in text form of a first dependency relationship by indicating that, in response to the value of the first configurable element being set to a first value, a value of the second configurable element should be set by the user to a second value to tune the second software application; and based on a second rule, providing the context-based user assistance content to the user in the text form of a second dependency relationship by indicating that the value for the first configurable element should be set by the user to a third value in response to the value of the second configurable element being set to a fourth value to tune the first software application.

11. The method of claim 10, the service further comprising: determining information associated with the second configurable element, wherein the stored rules and the information are used to identify the context-based user assistance content.

12. The method of claim 10, wherein the stored rules are dynamically modified when the information component is modified.

* * * * *